US006412675B1

(12) United States Patent
Pope (10) Patent No.: US 6,412,675 B1
(45) Date of Patent: Jul. 2, 2002

(54) ELONGATE ARTICLE CARRIER FOR VEHICLES

(76) Inventor: Billy G. Pope, 204 Pearl Dr., Milledgeville, GA (US) 31061

( * ) Notice: Subject to any disclaimer, the term of this patent is extended or adjusted under 35 U.S.C. 154(b) by 0 days.

(21) Appl. No.: 09/564,567

(22) Filed: May 5, 2000

(51) Int. Cl.$^7$ ................................................. B60R 9/00
(52) U.S. Cl. ........................ 224/560; 224/325; 224/546
(58) Field of Search ................................. 224/560, 546, 224/325, 561, 550, 556; 211/59.1, 62, 63

(56) References Cited

U.S. PATENT DOCUMENTS

| | | |
|---|---|---|
| 1,919,271 A | 7/1933 | Cady |
| 2,302,300 A | 11/1942 | Davies |
| 2,635,796 A | 4/1953 | Davolt |
| 4,108,342 A | 8/1978 | Riva |
| 4,262,831 A | 4/1981 | Buchanan |
| 4,375,268 A | 3/1983 | Speck |
| 4,596,345 A | 6/1986 | Stamp |
| 4,607,773 A | 8/1986 | Mason |
| 4,942,989 A | 7/1990 | Miller |
| 5,029,785 A | 7/1991 | Besong, Jr. |
| 5,230,449 A * | 7/1993 | Collins et al. .......... 224/560 X |
| 6,032,842 A * | 3/2000 | Brickner ..................... 224/560 |

FOREIGN PATENT DOCUMENTS

| | | |
|---|---|---|
| JP | 11-099963 | 4/1999 |

* cited by examiner

Primary Examiner—Stephen K. Cronin
Assistant Examiner—Maerena W. Brevard
(74) Attorney, Agent, or Firm—Richard C. Litman (57) ABSTRACT

An elongate article carrier for use with motor vehicles provides at least two separate wide, thin, flexible, elongate straps or bands, each of which in turn supports a rigid article support hanger which is removably secured to the band. Each of the bands includes a vehicle attachment end and a hanger attachment tab or portion extending therefrom. In one embodiment, the bands each have one or more protuberances captured in the vehicle attachment end, with the protuberance(s) providing for the removable attachment of each band to the vehicle. A panel (door, hood, or trunk) of the vehicle is opened, the protuberance is placed within the opened compartment, and the panel is closed to capture the protuberance within the compartment and preclude slippage of the band from the vehicle so long as the compartment remains closed. A plurality of such protuberances in a single band provides for height adjustment of the band, if so desired. An alternative embodiment includes a rigid bracket for removably securing to the upper lip of the side wall of a pickup truck box, for using such a vehicle as an elongate article carrier. Each of the article carrier band embodiments further includes a padded or cushioned area depending from the hanger attachment tab and sandwiched between the rigid article support hanger and the vehicle structure, thereby protecting the finish of the vehicle during use of the present invention.

20 Claims, 5 Drawing Sheets

ELONGATE ARTICLE CARRIER FOR VEHICLES

BACKGROUND OF THE INVENTION

1. Field of the Invention

The present invention relates generally to devices and attachments for carrying articles externally upon a vehicle, and more specifically to an assembly of removably attachable devices for supporting the front, rear, and medial portions of one or more elongate articles for carriage along the side of a motor vehicle. The various devices are removably secured to the vehicle by gripping one end of each support between the hood, trunk, and/or door of the vehicle, or over a pickup truck box sidewall edge.

2. Description of the Related Art

In the course of making home repairs, remodeling, etc., the home handyman often finds it necessary to transport relatively long articles from store to home or other site where the materials will be used. Elongate materials for such projects may comprise PVC or metal pipe, plastic gutters, electrical metal tubing (EMT), wood or plastic moldings, lengths of lumber, elongate tools, etc. While a professional contractor often has a relatively large vehicle for transporting such materials as well as tools for use at the job site, the home handyman is generally restricted to using the family automobile, or perhaps a pickup truck with a relatively short bed, for transporting such elongate materials.

Various schemes have been used for transporting such materials using a conventional passenger automobile, such as passing the materials diagonally through the interior to extend from one window, tying the materials over the roof of the vehicle, etc. Such elongate article transport means are cumbersome to use, as much time must be spent in securing padding between the materials and the roof or other structure of the vehicle, and tying the materials down or otherwise securing them. Pickup trucks often do not provide any more satisfactory means of carrying such articles, as many pickups have a cargo box or bed less than eight feet in length, with some elongate materials having a length of twelve feet or more. Thus, even with a pickup truck, it is often necessary to flag the end of the load and to arrange further means for securing the load in the bed, as the tailgate must be left open.

Accordingly, a need will be seen for a means of easily securing elongate articles to the exterior of a motor vehicle, and transporting those articles securely and safely from one site to another. The present invention responds to this need by means of a series of separate hangers or attachments which removably secure to various areas of the vehicle as required. Each of the hangers comprises a flexible sheet of material which is captured between various openable and fixed components of the vehicle (hood and fender, trunk and fender, door and roof) to extend therefrom. A rigid metal support rack is removably attached to each hanger strap to support the elongate article load therein. Padding is provided between each support rack and the vehicle body.

In another embodiment, a rigid, padded hanger is provided to secure over the upper edge or lip of the cargo box of a pickup truck, with forward and/or medial hangers removably securing respectively between the hood and front fender and door and roof of the pickup, as required. In each embodiment, either two or three hangers may be used as required, depending upon the length of the materials and their rigidity or flexibility. At least the medial support may include a series of stops to provide for height adjustment thereof, as desired.

A discussion of the related art of which the present inventor is aware, and its differences and distinctions from the present invention, is provided below.

U.S. Pat. No. 1,919,271 issued on Jul. 25, 1933 to Charles K. Cady, titled "Lumber Rack," describes a rigid, generally S-shaped hook with an upper end which is inserted between the window glass and window sill of a vehicle door. The opposite end serves as the elongate article support. Padding is placed along the contact side of the hook where it would contact the side of the vehicle door. This device is limited in its utility, as many vehicles have fixed rear windows and preclude the installation of the Cady device between the window and window sill of the vehicle body. Moreover, the removable rigid rack portion of the present invention enables it to remain secured about the elongate articles to hold them securely together while the articles are removed from the flexible portions of the carrier which remain attached to the vehicle.

U.S. Pat. No. 2,302,300 issued on Nov. 17, 1942 to William O. Davies, titled "Carrier," describes a hook device similar to that of the Cady '271 U.S. Patent described immediately above. However, the Davies device includes a suction cup which extends inwardly to contact the outer surface of the vehicle and protect the vehicle finish. As in the case of the Cady device, the Davies device does not provide a rigid rack component which is removably attachable to a flexible hanger portion, with the hanger portion in turn being removably secured to some component of the vehicle.

U.S. Pat. No. 2,635,796 issued on Apr. 21, 1953 to Pembroke O. Davolt, titled "Parcel Tie For Automobiles," describes a pair of flexible straps, with one end of each strap having a toggle or head attached thereto and the opposite end of each strap forming a loop through which a tiedown ring is secured. The toggle ends are captured between the hood and front fender of the vehicle, with a tiedown line being passed through each tiedown ring and secured about the article to secure it to the vehicle. Davolt does not provide any removable rigid structure for securing elongate articles thereto, as in the present elongate article carrier, nor does he provide any form of padding or protective means between his article carrier and the vehicle structure, as provided by the present invention. Moreover, Davolt does not provide any form of adjustment for his device, nor any intermediate support means, each of which is provided by the present elongate article carrier invention.

U.S. Pat. No. 4,108,342 issued on Aug. 22, 1978 to Ralph D. Riva, titled "Carrier Attachment For Automobiles," describes a device more closely related to the device of the Davolt '796 U.S. Patent discussed immediately above, than to the present invention. The Riva device comprises a pair of components each having a plastic coated cable having a dowel or toggle at one end and a loop at the opposite end. The devices may also include a small hook for securing beneath the rain gutter of the vehicle to tie loads across the roof of the vehicle. However, the hook is much too small for use in hanging from the upper edge of a pickup truck box. The elongate articles being carried are tied by a cord to the loop of the cable; no padding is provided between the materials and the exterior finish of the vehicle. In addition, the relatively thin cable has little resistance to movement, which would allow the load to swing fore and aft to further mar the finish of the vehicle. The width of the flexible strap portions of the present article carrier components, precludes such fore and aft motion in transit.

U.S. Pat. No. 4,262,831 issued on Apr. 21, 1981 to William I. Buchanan, titled "Traffic Cone Rack For Mounting On A Vehicle," describes a device having a rigid metal plate for bolting or other permanent attachment to the bumper or other structure of a vehicle. A cone rack formed of a rigid rod extends from the plate. No means is provided for attaching the device to a vehicle side without damaging the vehicle finish. Moreover, no flexible padded protective portion is provided by Buchanan, nor is any adjustment provided, as in the present article carrier invention.

U.S. Pat. No. 4,375,268 issued on Mar. 1, 1983 to Gordon C. Speck, titled "Automotive Vehicle Bracket," describes a single rigid unitary component having a spaced apart pair of generally U-shaped supports connected by an elongate bar. The device is secured within a vehicle by means of a pair of clips which are wedged between the upper trim molding and headliner of the vehicle. The clips are not configured for securing between the hood or trunk and fender of the vehicle, as provided by the flexible hangers of the present elongate article carrier. Moreover, the supports of the Speck device are not removable from the connecting bar or attachment clips, whereas the article supports or holders of the present invention are removable from the flexible vehicle attachment hangers with the hangers being adjustable for spacing.

U.S. Pat. No. 4,596,348 issued on Jun. 24, 1986 to John C. Stamp, titled "Car-Mounted Carrier," describes a device comprising a pair of flexible straps each having a bulbed end for capturing beneath the edge of the hood—fender and trunk—fender interface. The distal ends of the straps have grommets installed therein, for passing a cord or the like therethrough for tying elongate articles to the straps. The only padding means provided are separate lengths of closed cell foam material wrapped about the elongate articles, rather than being integral with the straps as in the case of the present invention. Stamp does not provide any removable rigid article support bracket, as in the present invention, and the Stamp device would appear to be subject to swaying, as in the case of the device of the Riva '342 U.S. Patent discussed further above.

U.S. Pat. No. 4,607,773 issued on Aug. 26, 1986 to Thomas A. Mason, titled "Vehicle Mounted Long Article Carrying Utility Bracket With Adjustable Cross Bar," describes a device having a series of generally S-shaped rigid brackets. One end of each bracket secures to the vehicle structure, with the opposite end serving to support elongate articles therein, somewhat in the manner of the devices of the Cady '271 and Davies '300 U.S. Patents discussed further above. However, the vehicle attachment portions of the Mason brackets are thickly padded, and cannot be inserted between closed panels of the vehicle. The Mason brackets must be secured over a window sill of an open window, and/or over the edge of an open trunk lid, whereas the present article carrier includes relatively wide but thin and flexible straps which easily fit between closed panels (trunk, hood, door) of the vehicle. Moreover, the hangers of the Mason device are interconnected, whereas the present hangers are independent of one another, relying only upon the vehicle structure for spacing and positioning.

U.S. Pat. No. 4,942,989 issued on Jul. 24, 1990 to Kevin W. Miller, titled "Device For Carrying Lumber And The Like, " describes a pair of rigid brackets including padding on the vehicle contact portions thereof, somewhat like the device of the Mason '773 U.S. Patent discussed above. The same limitations noted for the Mason device are seen to apply here, with the Miller device being too thick to secure between panels of the vehicle structure and requiring the windows to be rolled down for use. The present invention does not have such limitations, due to the thin hangers.

U.S. Pat. No. 5,029,785 issued on Jul. 9, 1991 to James A. Besong, Jr., titled "Car Mounted Article Carrying Bracket," describes a system having a pair of separate, rigid components which secure to the vehicle between the hood and trunk and their respective fenders. A pair of padded feet extends from each component to brace against the vehicle structure. The footpads are relatively small in comparison to the cushioned area of the present article carrier, and could distort the underlying sheet metal in the event that relatively heavy loads are carried by the Besong, Jr. device. Moreover, each of the Besong, Jr. devices is essentially unitary (with adjustable components), with no separable support bracket and hanger strap, as in the present article carrier. It is also noted that the bottom support surface of the Besong, Jr. brackets are essentially level with the upper fender line, with the forward bracket and/or materials carried therein interfering with the right side exterior mirror. This is not a problem with the present article carrier, which depends below the fender line to carry any articles relatively low on the vehicle.

Finally, Japanese Patent Publication No. 11-099,963 published on Apr. 13, 1999 to Mazda Motor Corporation illustrates a vehicle having an open rear portion with various attachments being provided therefor. None of the attachments is adapted for the carriage of elongate articles along the side of the vehicle, as provided by the present invention.

None of the above inventions and patents, either singly or in combination, is seen to describe the instant invention as claimed.

SUMMARY OF THE INVENTION

The present invention comprises an elongate article carrier for vehicles, for the external carriage of such articles as garden tools, fishing poles, lumber, PVC and EMT tubing and pipe, etc. upon an automobile, pickup truck, or the like. The present article carrier obviates the need for carrying such elongate articles within the vehicle interior (or cargo bed of a pickup), thus simplifying the loading of the vehicle and precluding any need for flags or the like to be attached to the distal ends of the articles. As all elongate articles are carried upon the vehicle exterior, windows and doors may remain closed in inclement weather.

The present invention comprises at least two thin, flexible, wide, elongate straps or bands. Each strap has a vehicle attachment end and a cargo securing portion extending therefrom. The vehicle attachment end may comprise one or more protuberances imbedded therein, for capturing within the trunk, engine compartment, and/or passenger compartment of the vehicle. The appropriate panel (door, hood, trunk) of the vehicle is opened, the attachment end and protuberance are placed within the compartment, and the panel is closed to capture the thicker protuberance within the compartment. The opposite cargo securing portion includes a tab for the removable attachment of a rigid hanger therefrom, with the hanger supporting elongate articles placed therein. A padded area extends below the hanger attachment tab to preclude damage to the vehicle finish. An alternative embodiment comprising a rigid bracket is used to attach an article carrier to the side of a pickup truck box.

Accordingly, it is a principal object of the invention to provide an improved elongate article carrier for vehicles, comprising at least two thin, flexible, wide, elongate straps or bands removably attachable to the exterior of a motor vehicle, with each of the straps or bands having a rigid article support hanger removably depending therefrom.

It is another object of the invention to provide an improved elongate article carrier which straps each have an attachment end which may include one or more protuberances therein, for capturing within the engine, trunk, or passenger compartment of the vehicle by closing the appropriate panel upon the strap to capture the protuberance therein.

It is a further object of the invention to provide an improved elongate article carrier having an adjustable length by means of a plurality of protuberances disposed within the attachment end thereof.

An additional object of the invention is to provide an improved article carrier for removable installation to the side wall of the box of a pickup truck, with the article carrier including a rigid bracket therein for hooking over the box side wall.

Still another object of the invention is to provide an improved article carrier including cushioning or padding means disposed between the rigid article support hanger and the surface of the vehicle, thereby precluding damage to the vehicle.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
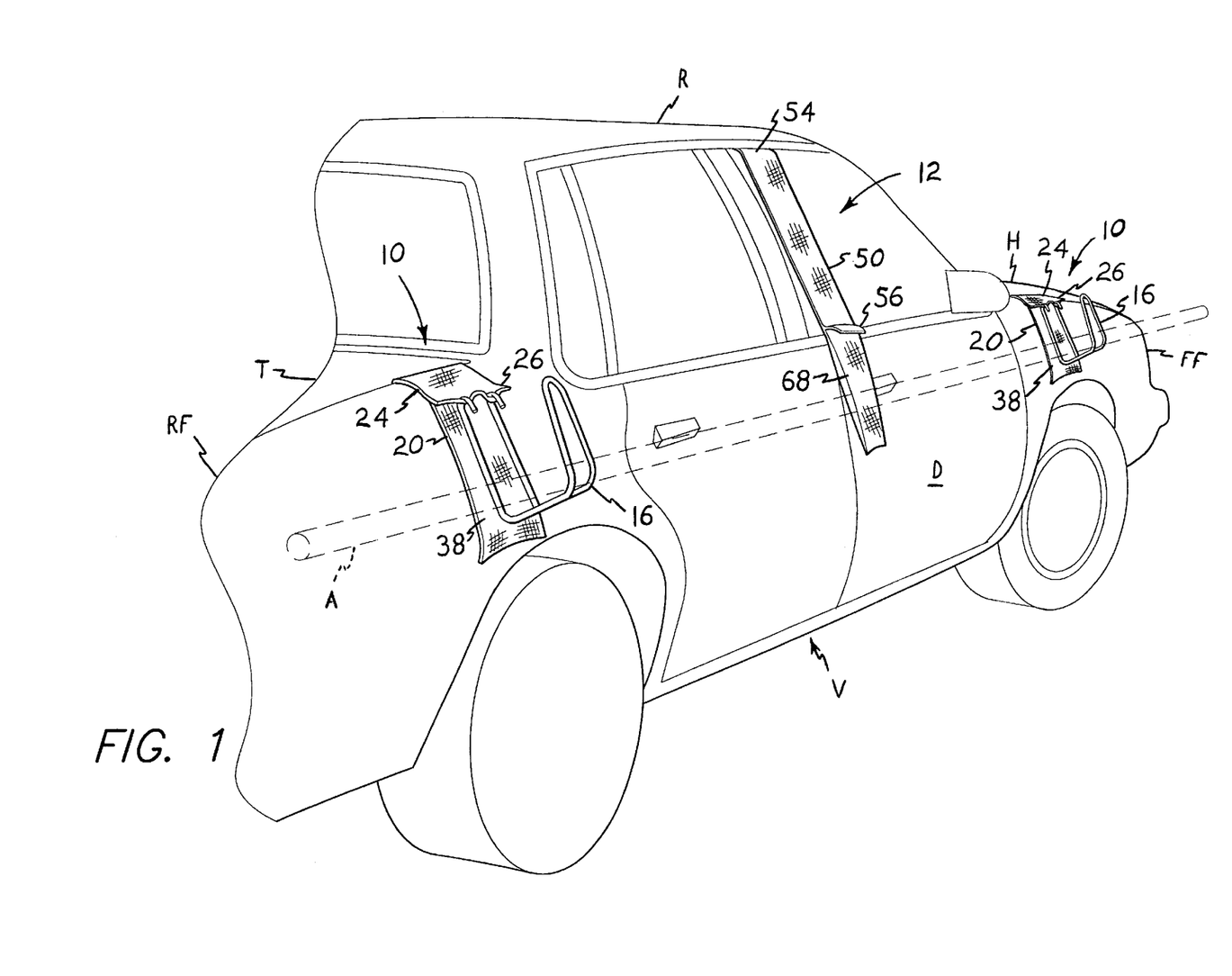
FIG. 1 is an environmental perspective view showing the present elongate article carrier installed upon a passenger vehicle.
Figure 2:
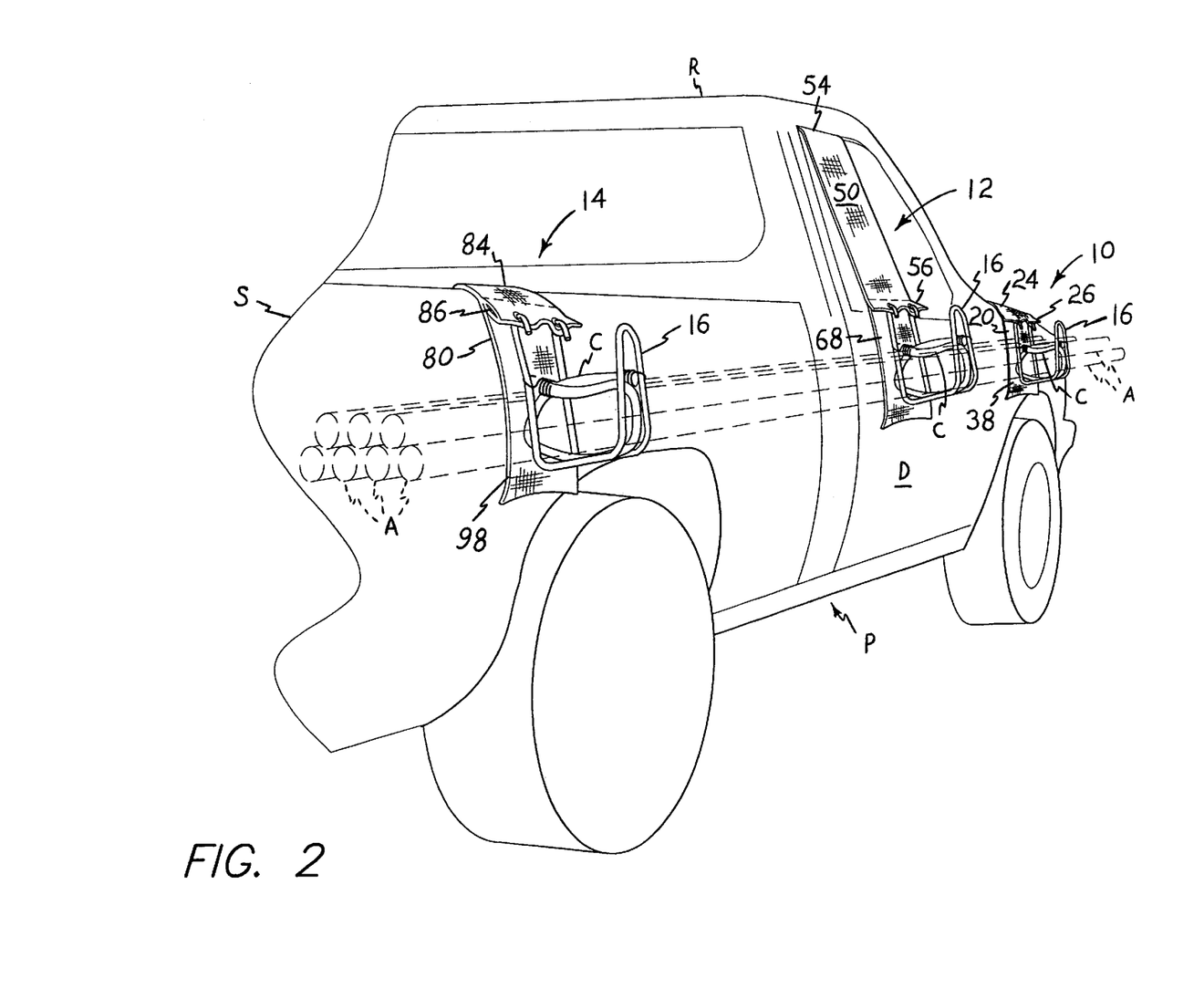
FIG. 2 is an environmental perspective view of an alternate embodiment, showing an article carrier strap for removable installation upon the side wall of a pickup truck box.

The present invention comprises an apparatus for carrying elongate articles externally along the side of a motor vehicle, thus obviating need for carrying the articles within the interior of the vehicle with one end of such articles projecting from an open window. FIG. 1 illustrates a first embodiment of the present invention, comprising a series of elongate article carriers 10 and 12 removably secured to various panels of the vehicle V. The conventional motor vehicle V includes various openable and adjacent fixed panels, including an openable hood H with a closely fitting front fender FF to each side or edge thereof, with a trunk lid T and closely fitting rear fenders RF to each side thereof. At least one door D is provided on each side of the vehicle V, with the upper frame or edge of the door D fitting closely with the roof R of the vehicle V, generally as shown in FIG. 1. A third embodiment 14 is illustrated in FIG. 2, for securing over the upper edge of the sidewall S of the cargo box of a pickup truck P.

The embodiments 10 and 12 make advantageous use of the slight gaps or clearances provided between the various openable panels and their adjacent relatively fixed components of the vehicle V. The upper ends of the present article carriers 10 and 12 may be captured between various openable and fixed components of the vehicle V, thus anchoring the carriers 10 and 12 securely to the vehicle V as desired. The carriers 10 and 12 each include a rigid article support hanger 16 removably secured thereto, for carrying and supporting elongate articles A therein.

Figure 3:
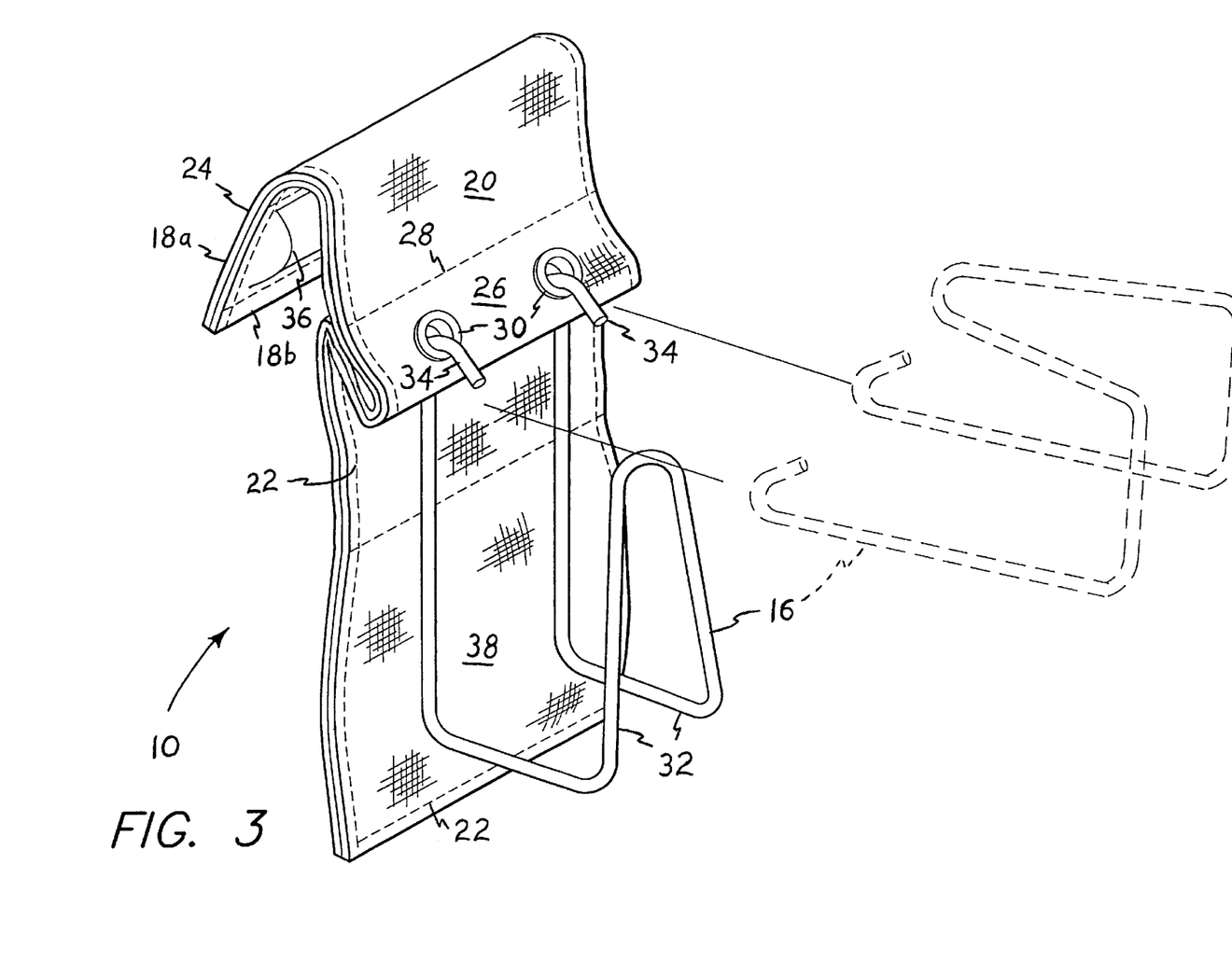
FIG. 3 is a detailed perspective view of a hood or trunk article carrier assembly, showing various details thereof and the removable attachment of the hanger bracket thereto.

FIG. 3 provides a detailed illustration of a first embodiment article carrier 10, as shown installed in the forward and rearward positions on the vehicle V of FIG. 1. The article carrier 10 is essentially constructed of two plies or layers 18a and 18b of a flexible fabric or other suitable material to form a wide, thin, and flexible elongate strap 20. The strap 20 may be formed by folding a single sheet of material over along one edge, and securing the two folded plies along all edges by means of stitching 22 or other suitable means.

The strap 20 includes a vehicle attachment end 24, with an article support hanger attachment portion 26 depending from the attachment end 24. The strap 20 is gathered at a point below the attachment end 24 to form the hanger attachment portion or tab 26 extending across the width of the strap 20, with stitching 28 used to secure the tab 26. This results in four plies of material to provide an extremely strong and durable attachment area for the article hanger 16. A pair of grommets 30 are installed through the hanger attachment portion or tab 26, to provide for the removable attachment of the article hanger 16 to the strap 20.

The article support hanger 16 is preferably formed from a length of metal rod. The rod is bent in the center to form two ends, with the continuous intermediate portion of the rod bent to form an outward and upward, generally squared U-shaped support area 32. The ends are bent to form first and second fingers or hooks 34, which are used to removably engage the grommets 30 of the hanger attachment tab 26 of the strap 20, as shown in FIG. 3.

The double layer of material used to form the present article carrier embodiments provides advantages in addition to the greater strength provided by two layers of material. The two layers 18a and 18b may be used to enclose other components, as shown in the vehicle attachment end portion 24 of the device 10 of FIG. 3. The double layers 18a and 18b are used to form a pocket in the upper or vehicle attachment end 24 of the carrier 10, into which a relatively thick component (length of PVC tubing or pipe, wood or plastic dowel, etc.) is inserted. The end of the pocket is then sewn shut during the final assembly of the carrier 10, to form a protuberance 36 in the vehicle attachment end 24 of the device.

This relatively thick protuberance 36 is thicker than the gap between any of the fixed and openable components (hood/fender, trunk/fender, etc.) of a conventional motor vehicle, and thus cannot pass through such a gap when the hood, trunk, etc. is closed with the strap portion 20 placed within the gap. The protuberance 36, and thus the vehicle attachment end 24, of the carrier device 10 is captured within the closed compartment (trunk, engine compartment, etc.) of the automobile, thus locking the carrier 10 securely to the vehicle during the time the compartment remains closed, generally as shown in FIG. 1 of the drawings. The carrier 10 is easily removed from the vehicle as desired, merely by unlocking the trunk or opening the hood.

Figure 4:
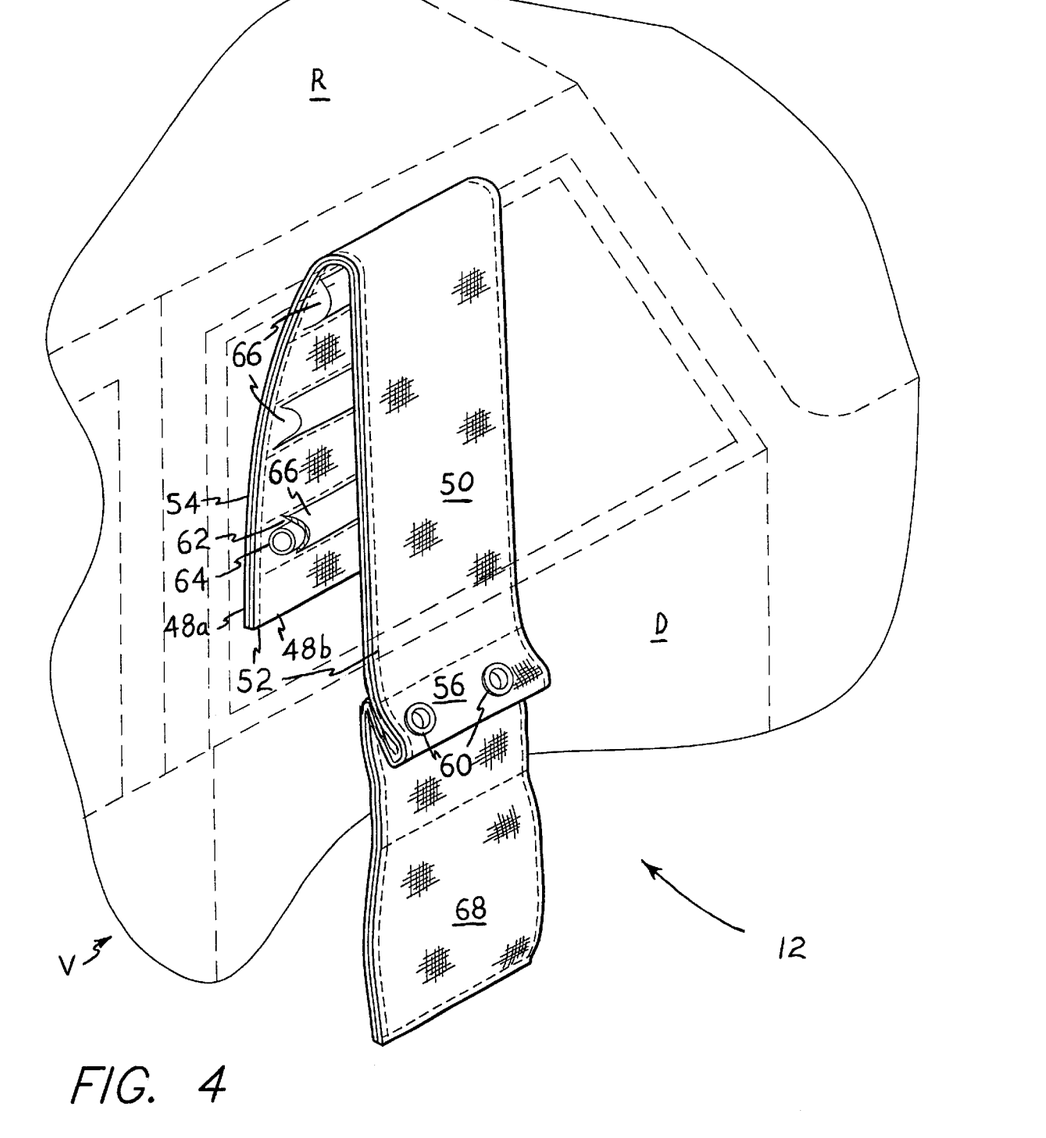
FIG. 4 is a detailed perspective view of an article carrier strap for removable installation in the door of a vehicle, showing installation and other details thereof.
Figure 5:
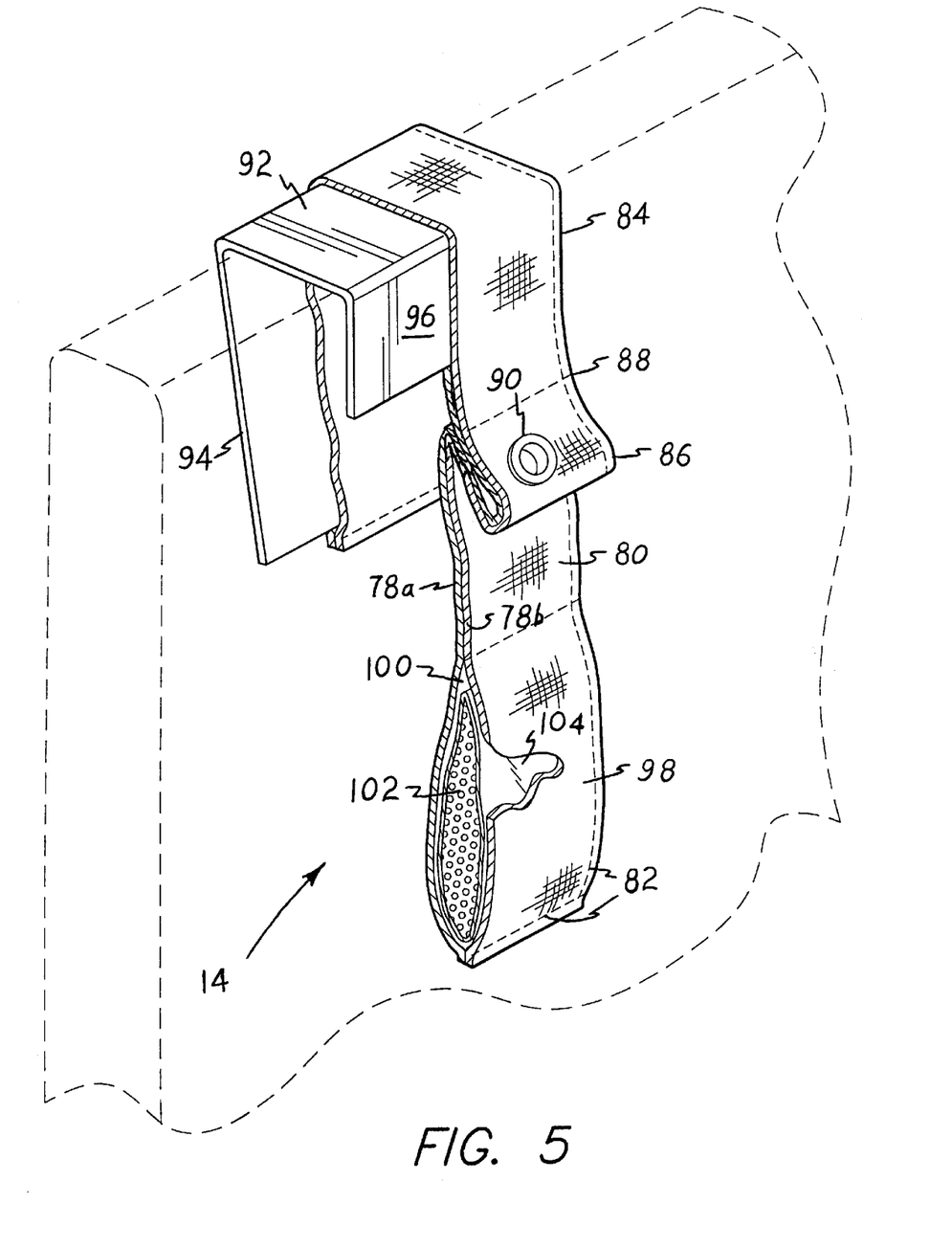
FIG. 5 is a broken away detailed perspective view of the pickup box side wall attachment embodiment of FIG. 2, showing further details thereof.

The opposite lower portion 38 of the carrier device 10 includes padding or cushioning means therein, as shown in the carrier device 14 embodiment of FIG. 5. In this respect, all of the various carrier embodiments 10, 12, and 14 are essentially identical, and details of the padding means 40 will be understood to apply to the embodiments 10 and 12 of FIGS. 1 through 4 as well as to the embodiment 14 of FIGS. 2 and 5. The double thickness of material used to construct the present elongate article carriers 10 through 14 provides a pocket for the installation of padding or cushioning means therein, with details of such padding or cushioning means being discussed further below. The padding or cushioning means will be seen to be disposed between the body of the vehicle and the support hanger 16 when the article carrier 10 through 14 is secured to the vehicle, as shown in FIGS. 1 and 2.

To this point, only a first embodiment article carrier 10 has been discussed in detail. This single embodiment works well for use with a conventional passenger vehicle V as shown in FIG. 1 of the drawings, as an identical carrier 10 may be removably installed between the hood H and front fender FF and between the trunk lid T and rear fender RF of the vehicle V. However, in many instances the elongate articles A being carried are relatively flexible (e.g., relatively thin PVC pipe or tube, relatively small thicknesses of quarter round or other molding, etc.), and should be supported along their central area as well as at each end.

Accordingly, a second embodiment 12 of the present elongate article carrier provides for removable installation between the upper frame of the door D and the roof R of the vehicle, as shown in FIGS. 1 and 4. (An identical carrier 12 is also shown installed to the door D of the pickup truck P of FIG. 2.) The second embodiment carrier 12 has a somewhat similar configuration to that of the first embodiment carrier 10, comprising two layers of fabric 48a and 48b to form a strap 50 secured by stitching 52.

The strap 50 includes a vehicle attachment end 54, as in the attachment end 24 of the carrier embodiment 10 of FIGS. 1 through 3. However, the end 54 of the carrier 12 of FIG. 4 differs from its equivalent component of the carrier 10 of FIGS. 1 through 3, in that the attachment end 54 of the article carrier 12 is considerably longer. A series of pockets 62 are formed in the elongate vehicle attachment portion 54 of the carrier 12, with a relatively thick component 64 (pipe, rod, etc.) being inserted into each pocket 62 before the final stitching 52 is done along the otherwise open edge of the device. Completion of the stitching 52 results in a series of spaced apart protuberances 66 along the vehicle attachment portion 54 of the carrier 12, thus providing for adjustment of the height of the carrier 12. A user of the present invention need only install a carrier 10 at the front and rear of the vehicle, then install a carrier 12 by aligning the hanger attachment tab 56 or hanger 16 attached thereto with corresponding components of the forward and rearward carriers 10, and close the door D upon the vehicle attachment portion 54 of the carrier 12.

The remainder of the article carrier 12 of FIGS. 1, 2, and 4 is essentially identical to the corresponding components of the carrier 10 of FIGS. 1 through 3, having a pair of grommets 60 installed through the hanger attachment tab or portion 56 to provide for the removable attachment of a rigid article support hanger 16, which hanger 16 is identical for all embodiments. The lower portion 68 of the carrier embodiment 12 is also thickly padded in order to preclude damage to the door D of the vehicle, as in the padded area 38 of the article carrier embodiment 10. It should be noted that the article carrier 14 is placed well to the rearward edge of the door D, as is clearly shown in FIGS. 1 and 2 of the drawings. Thus, the lateral area which might be blocked by the carrier 12 is positioned at the very edge of the peripheral vision of the driver of the vehicle V or pickup truck P, and closely matches the area of the central or "B" pillar of the vehicle. The right side exterior mirror is completely visible to the driver using the present article carrier invention, and any articles A carried therein are positioned below the side windows of the vehicle V or pickup P to provide a clear field of view, as is clearly shown in FIGS. 1 and 2 of the drawings.

FIG. 2 illustrates the removable installation of one carrier of each of the three embodiments 10 through 14 of the present invention on a pickup truck P. A first embodiment article carrier 10 is installed with its vehicle attachment portion captured between the hood and front fender of the pickup truck P, in the manner shown for the forwardly installed carrier 10 of FIG. 1.

A central, second embodiment carrier 12 is installed with its vehicle attachment portion 54 gripped between the upper edge of the door D and the roof R of the pickup truck P. This installation of the first and second embodiment article carriers 10 and 12 respectively at the hood to front fender and door to roof seams, will be seen to be identical with the installation of those components illustrated in FIG. 1 of the drawings.

However, a third embodiment article carrier 14 includes a different attachment end or portion for securing removably over the upper edge of the side wall S of the cargo box of the pickup truck P, as shown in FIG. 2 of the drawings. FIG. 5 provides a detailed view of this embodiment 14, as well as a disclosure of the padding means used in the lower portions of each of the embodiments of the present invention. The article carrier 14 is constructed similarly to the article carriers 10 and 12, being formed of a folded over sheet of fabric material to form a relatively wide strap 80 formed of two plies or sheets 78a and 78b joined by edge stitching 82. The strap 80 includes a vehicle attachment end 84, as in the other two embodiments 10 and 12 of the present invention. However, the attachment end 84 differs from those of the first two embodiments 10 and 12, comprising a rigid, generally squared off U-shaped bracket 92 which is captured between the two sheets 78a and 78b. The bracket 92 is configured to hang or secure over the upper edge of a pickup truck box side wall S, as shown in FIGS. 2 and 5. The inner panel 94 of the bracket 92 may be bent slightly toward the outer panel 96, to provide positive grip for the device 14.

The remainder of the device is essentially the same as those equivalent components of the carrier embodiments 10 and 12, having a hanger attachment tab 86 formed by stitching 88, grommets 90 (only one of which is shown in the broken away view of FIG. 5), and padded lower portion 98. The article carrier 14 is installed upon the upper edge of the cargo box side wall S by bending the two facing panels 94 and 96 slightly apart and lowering the attachment end 84 of the article carrier 14 over the upper edge of the cargo box side wall S, with the bracket or plate 92 gripping the side wall S between the two facing panels 94 and 96 of the plate or bracket 92.

FIG. 5 also illustrates details of the lower padded area 98 of the article carrier embodiment 14, which will be understood to be identical to the padding or cushioning means provided for the other carrier embodiments 10 and 12. As noted above, each of the embodiments of the present article carrier is formed of a folded over sheet of material, resulting in two plies or layers, e.g., the first and second plies 78a and 78b of the article carrier 14 of FIG. 5. Just as the two plies of the upper portion of the carrier 14 were used to form a pocket for the bracket or plate 92, these two plies are also used to provide a pocket 100 for placement of resilient cushioning material 102 therein. A flexible, moistureproof bag or container 104 is used to contain the resilient material to preclude moisture absorption and potential problems resulting therefrom, with the container 104 being sewn between the two plies of the lower portion of the device during final stitching.

The present elongate article carrier invention is used essentially as illustrated in FIGS. 1 and 2 of the drawings, with a carrier first embodiment 10 being captured between the hood H and front fender FF and trunk lid T and rear fender RF of a passenger vehicle V. A central carrier 12 may be installed between the upper edge of the passenger door D and the roof R of the vehicle V, if required or desired. Support hangers or racks 16 are installed in at least the forward and rearward article carriers, with such a hanger 16 optionally installed with the central carrier 12 as well. Alternatively, a bungee cord C may be wrapped about the central portion of the elongate article A bundle, and hooked to the grommets of the central article carrier 12.

In FIG. 2, a first embodiment carrier 10 is secured at the hood and front fender of the pickup truck P, with a second embodiment carrier 12 secured between the upper rearward portion of the door D and adjacent roof R. A third embodiment carrier 14 is secured over the upper edge of the pickup truck box side wall S. Each of the article carriers 10 through 14 has a support hanger 16 secured thereto, with a series of elongate articles A resting therein. The elongate articles A are secured in place within the support hangers, and thus to the article carriers and vehicle to which the carriers are secured, by means of a series of bungee cords C or the like which are wrapped about the articles at each carrier and hooked to the corresponding rigid support hanger 16. The resulting arrangement provides a very secure means of hauling elongate articles with a conventional passenger car or pickup truck.

In summary, the present elongate article carrier invention provides a much needed means of transporting elongate articles such as lumber, pipe and tubing, garden tools, gutters, fence components, etc. from one site to another, without requiring awkward placement partially within and partially outside the vehicle, or the flagging of long rearwardly trailing extensions, etc. The article carriers of the present invention are extremely easy to install upon the vehicle, merely by opening the hood and trunk and gripping the protuberance area of the carrier within the compartment after closing the hood or trunk panel. The medial carrier is used in the same manner, by gripping it between the door frame and roof of the vehicle. The forward and medial carriers are used in exactly the same manner for use with pickup trucks, but an alternative embodiment carrier is hooked over the upper edge of the pickup box side wall to serve as the rearward carrier. A rigid support hanger or rack is then hooked to each article carrier, the elongate materials placed within the hangers, and secured within the hangers by bungee cords or other suitable means.

As noted further above, the strap portions of the present elongate article carriers are relatively wide. This provides a significant benefit, in that such wide straps are not prone to swing laterally relative to their attachment to the vehicle (i.e., longitudinally in the direction of vehicle travel) due to acceleration and deceleration, wind loads, etc. This provides further stability for the load being carried by means of the present elongate article carrier invention.

Upon reaching the destination, the article carriers are easily removed from their attachment points on the vehicle by opening the appropriate compartments (hood, door, trunk) and lowering the bundle of elongate articles to the underlying surface. The article carrier used with a pickup box side wall is merely lifted from the side wall to remove the device from the truck. The article carriers may be left in place on the bundle of articles, if so desired, in order to provide further ease of carrying the bundle.

Alternatively, the support hangers may be unhooked from their positions on their respective article carriers, with the elongate articles remaining secured therein by means of the bungee cord attachments. Once the bundle of articles has been placed as desired, the bungee cords may be removed from the support hangers, and the article carrier strap portions rolled or folded to provide for compact storage of the assembly until needed again. Accordingly, the present elongate article carrier embodiments will prove to be a most desirable accessory for general contractors, home handymen, and others who have occasion to carry various elongate articles using a conventional passenger car, pickup truck, or the like.

It is to be understood that the present invention is not limited to the sole embodiment described above, but encompasses any and all embodiments within the scope of the following claims.

I claim:

1. An elongate article carrier for a vehicle, comprising:
   a wide, thin, flexible, elongate strap;
   said strap having a vehicle attachment end and an article support hanger attachment portion depending from said vehicle attachment end; and
   a rigid article support hanger extending from said article support hanger attachment portion of said strap, wherein said article support hanger is a metal rod.

2. The elongate article carrier for a vehicle according to claim 1, wherein said strap comprises two plies of fabric material.

3. The elongate article carrier for a vehicle according to claim 1, wherein:
   said article support hanger includes spaced apart first and second ends comprising fingers for engaging said article support hanger attachment portion of said strap; and
   said article support hanger further including a continuous elongate article support portion extending outwardly and upwardly from each of said fingers.

4. The elongate article carrier for a vehicle according to claim 1, including means for removably securing said article support hanger to said strap.

5. The elongate article carrier for a vehicle according to claim 4, wherein said means for removably securing said article support hanger to said strap comprises:
   a laterally disposed tab extending from said article support attachment portion of said strap;
   said tab including at least two grommets installed therethrough;
   said article support hanger having spaced apart first and second ends comprising fingers for removably engaging said grommets of said tab of said article support hanger attachment portion of said strap.

6. The elongate article carrier for a vehicle according to claim 1, with the vehicle including at least one closable compartment, wherein said vehicle attachment end of said strap includes at least one protuberance for capturing within the at least one closable compartment of the vehicle.

7. The elongate article carrier for a vehicle according to claim 6, wherein said vehicle attachment end of said strap includes a plurality of protuberances spaced apart from one another for adjusting said strap relative to the compartment of the vehicle.

8. The elongate article carrier for a vehicle according to claim 1, with the vehicle including a cargo box side wall having an upper edge, wherein said vehicle attachment end of said strap includes a rigid bracket for removably securing over the upper edge of the cargo box side wall of the vehicle.

9. The elongate article carrier for a vehicle according to claim 1, including padding means disposed between the vehicle and said article support hanger when said article support hanger is attached to said strap, for protecting the vehicle from said article support hanger.

10. The elongate article carrier for a vehicle according to claim 9, wherein said padding means comprises:

said strap having at least a lower portion comprising a first and a second ply of material;

a resilient material sealingly disposed within a flexible, moistureproof container; and said moistureproof container permanently disposed between said first and said second ply of material of said lower portion of said strap.

11. An apparatus for the carriage of elongate articles on a vehicle, comprising:

at least a forwardly disposed and a rearwardly disposed article carrier;

each said article carrier including a wide, thin, flexible, elongate strap;

each said strap having a vehicle attachment end and an article support hanger attachment portion depending from said vehicle attachment end; and a rigid article support hanger removably extending from said article support hanger attachment portion of each said strap, wherein each said article support hanger is a metal rod.

12. The apparatus according to claim 11, wherein said each strap comprises two plies of fabric material.

13. The apparatus according to claim 11, wherein:

each said article support hanger includes spaced apart first and second ends comprising fingers for engaging a respective said article support hanger attachment portion of each said strap; and each said article support hanger further including a continuous elongate article support portion extending outwardly and upwardly from each of said fingers.

14. The apparatus according to claim 11, including means for removably securing each said article support hanger to a respective said strap.

15. The apparatus according to claim 14, wherein said means for removably securing each said article support hanger to a respective said strap comprises:

a laterally disposed tab extending from said article support attachment portion of each said strap;

each said tab including at least two grommets installed therethrough;

each said article support hanger having spaced apart first and second ends comprising fingers for removably engaging said grommets of said tab of a respective said article support hanger attachment portion of each said strap.

16. The apparatus according to claim 11, with the vehicle including at least one closable compartment, wherein said vehicle attachment end of each said strap includes at least one protuberance for capturing within the at least one closable compartment of the vehicle.

17. The apparatus according to claim 16, with the vehicle including at least one closable passenger door, including:

a centrally disposed article carrier;

said centrally disposed article carrier including a wide, thin, flexible, elongate strap;

said strap of said centrally disposed article carrier having a vehicle attachment end and an article support hanger attachment portion depending from said vehicle attachment end;

said vehicle attachment end of said strap of said centrally disposed article carrier including a plurality of protuberances spaced apart from one another for adjustable capture by the closable passenger door of the vehicle; and a rigid article support hanger removably extending from said article support hanger attachment portion of said strap of said centrally disposed article carrier.

18. The apparatus according to claim 11, with the vehicle including a cargo box side wall having an upper edge, wherein said vehicle attachment end of said strap of said rearwardly disposed article carrier includes a rigid bracket for removably securing over the upper edge of the cargo box side wall of the vehicle.

19. The apparatus according to claim 11, including padding means disposed between the vehicle and each said article support hanger when each said article support hanger is attached to a corresponding said strap, for protecting the vehicle from each said article support hanger.

20. The apparatus according to claim 19, wherein said padding means comprises:

each said strap having at least a lower portion comprising a first and a second ply of material;

a resilient material sealingly disposed within a flexible, moistureproof container; and said moistureproof container being permanently disposed between said first and said second ply of material of said lower portion of each said strap.

* * * * *